United States Patent
Leman (10) Patent No.: US 6,198,625 B1
(45) Date of Patent: Mar. 6, 2001

(54) HINGE ASSEMBLY FOR A PORTABLE COMPUTER

(75) Inventor: Michael V. Leman, Eagle, ID (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 09/324,398

(22) Filed: Jun. 3, 1999

(51) Int. Cl.[7] .............................. H05K 7/14; H05K 5/00; G06F 1/16
(52) U.S. Cl. ........................ 361/681; 361/682; 361/683; 364/208.1
(58) Field of Search ..................................... 361/683, 681, 361/680, 682; 16/221, 222–252, 342, 337, 303, 319, 332, 336; 364/708.1

(56) References Cited

U.S. PATENT DOCUMENTS

| | | | |
|---|---|---|---|
| 4,730,364 | * | 3/1988 | Tat-Kee .................................. 16/337 |
| 4,825,395 | * | 4/1989 | Kinser, Jr. et al. ................... 364/708 |
| 4,878,293 | * | 11/1989 | Kinser, Jr. et al. .................... 29/850 |
| 4,976,007 | * | 12/1990 | Lam ....................................... 16/302 |
| 5,028,913 | * | 7/1991 | Kitamura .............................. 340/711 |
| 5,043,846 | * | 8/1991 | Kinoshita .............................. 361/394 |
| 5,052,078 | * | 10/1991 | Hosoi .................................... 16/297 |
| 5,077,551 | * | 12/1991 | Saitou .................................. 340/700 |
| 5,081,742 | * | 1/1992 | Kobayashi ............................. 16/337 |
| 5,103,377 | * | 4/1992 | Kobayashi et al. ................... 361/394 |
| 5,142,738 | * | 9/1992 | Ojima ................................... 16/306 |
| 5,144,290 | * | 9/1992 | Honda et al. ........................ 340/711 |
| 5,233,502 | * | 8/1993 | Beatty et al. ........................ 361/729 |
| 5,235,356 | * | 8/1993 | Israel .................................... 351/153 |
| 5,237,488 | * | 8/1993 | Moser et al. ......................... 361/729 |
| 5,239,731 | * | 8/1993 | Lu ......................................... 16/340 |
| 5,283,862 | * | 2/1994 | Lund .................................... 395/155 |
| 5,367,346 | * | 11/1994 | Branning .............................. 351/153 |
| 5,455,987 | * | 10/1995 | Svehaug ............................... 16/267 |
| 5,498,165 | * | 3/1996 | Tseng ..................................... 439/31 |
| 5,507,072 | * | 4/1996 | Youn .................................... 16/261 |
| 5,566,048 | * | 10/1996 | Esterberg et al. ................... 361/681 |
| 5,583,529 | * | 12/1996 | Satou .................................... 345/87 |
| 5,590,024 | * | 12/1996 | Honda et al. ........................ 361/684 |
| 5,594,619 | * | 1/1997 | Miyagawa et al. .................. 361/681 |
| 5,632,064 | * | 5/1997 | Lautenschlager ..................... 16/272 |
| 5,632,066 | * | 5/1997 | Huong .................................. 16/338 |
| 5,751,544 | * | 5/1998 | Song .................................... 361/681 |
| 5,768,098 | * | 6/1998 | Murayama ........................... 361/684 |
| 5,805,415 | * | 9/1998 | Tran et al. ........................... 361/681 |
| 5,844,774 | * | 12/1998 | Gushiken et al. ................... 361/681 |
| 5,898,567 | * | 4/1999 | Satake .................................. 361/687 |

FOREIGN PATENT DOCUMENTS

| | | | | |
|---|---|---|---|---|
| 1312116 | * | 11/1962 | (FR) . | |
| 407225636 | * | 8/1995 | (JP) ................................. G06F/1/18 |
| 409283946 | * | 10/1997 | (JP) ................................. H05K/5/03 |

* cited by examiner

*Primary Examiner*—Leo P. Picard
*Assistant Examiner*—Anatoly Vortman
(74) *Attorney, Agent, or Firm*—Trop, Pruner &Hu, P.C.

(57) ABSTRACT

A portable computer system may include a planar hinge to enable a display unit to be folded down on top of a base unit. The planar hinge may be located near an outside edge of the display unit, accommodating a large display. The display may occupy space near the bottom of the display unit that is ordinarily occupied by a hinge assembly. The base unit may include blade connectors to conduct power and output signals to female connectors on the display unit. Alternatively, the blade connectors may be located on the display unit while the female connectors may be incorporated in the base unit.

2 Claims, 8 Drawing Sheets

HINGE ASSEMBLY FOR A PORTABLE COMPUTER

BACKGROUND

The invention relates generally to portable computer systems, and more particularly to hinge assemblies for portable computers.

Computer users generally desire to view the output of a computer on a large display. Thus, one disadvantage of using a portable computer is that the display may have an undesirably small size. To remedy this problem, portable computer manufacturers continually strive to incorporate larger displays in portable computers. A display for a portable computer is typically part of a display unit, a unit that may be designed to fold down to rest on top of a base unit of the computer. For aesthetic purposes, the size of the display unit is generally limited to the dimensions of the base unit. Therefore, portable computer manufacturers attempt to maximize the space available for the display in the display unit. A conventional portable computer may include a hinge assembly that couples the display and base units together. Unfortunately, the hinge assembly may displace a substantial space in the display unit that the display may otherwise occupy.

Thus, it would be beneficial to provide a hinge assembly for a portable computer that consumes less space in the display unit.

SUMMARY

In one embodiment, a portable computer system is described which includes a planar hinge coupling a display unit to a base unit. The display unit may include two outside edges to which planar hinges may be mounted.

In another embodiment, an electrical connection mechanism may include a female electrical connector coupled to a first unit. A blade electrical connector may be coupled to a second unit. The second unit may be coupled to the first unit and may rotate to a position where the second unit rests against the first unit. The blade electrical connector may be adapted to maintain contact with the female electrical connector while the second unit rotates.

DETAILED DESCRIPTION

Figure 1:
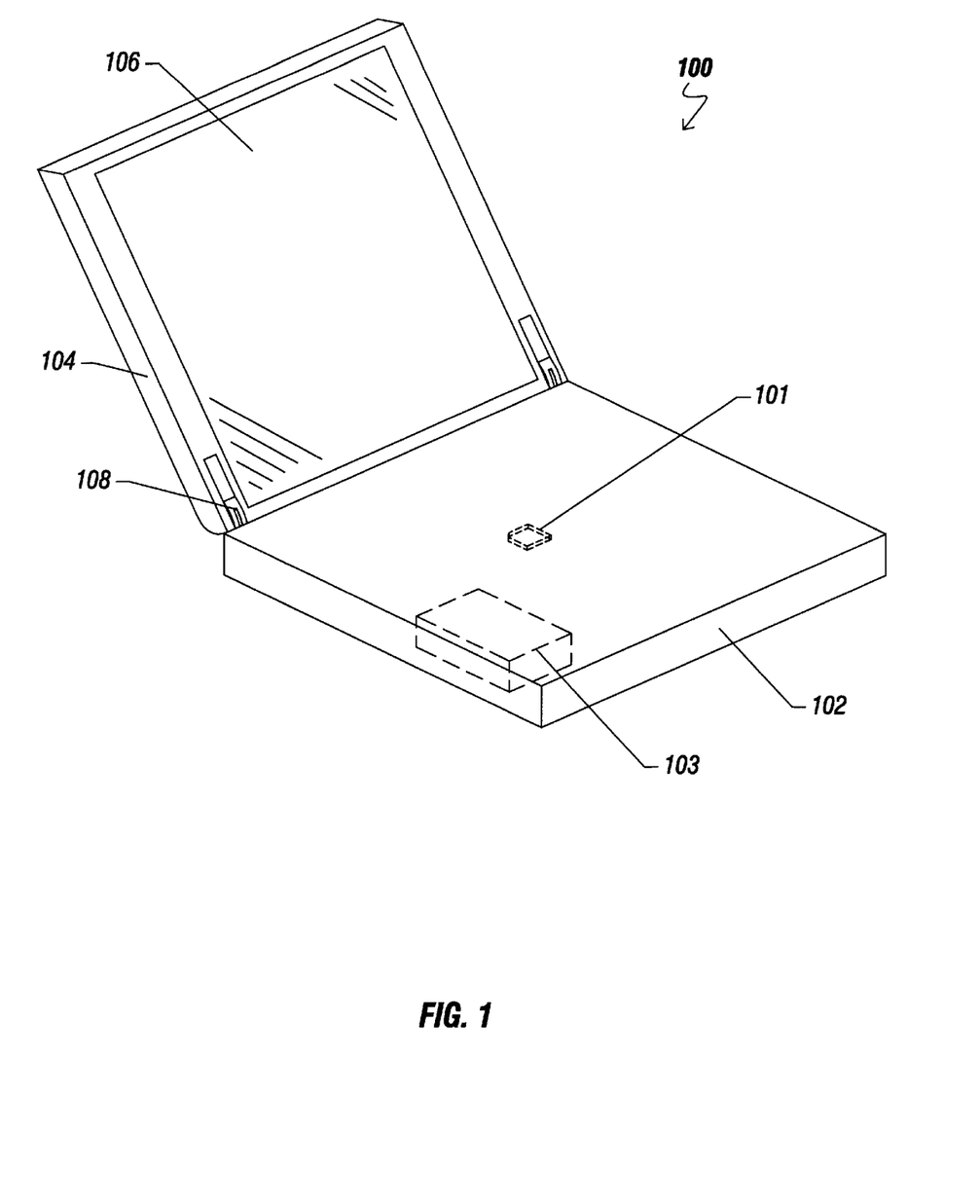
FIG. 1 is a perspective view of a portable computer in accordance with one embodiment of the invention.

Referring to FIG. 1, an illustrative portable computer 100 in accordance with one embodiment of the invention includes a base unit 102 that may include a keyboard, system memory, a mass storage device, a central processing unit 101, and a power source 103. A display unit 104 may be coupled to the base unit 102 by a hinge 108. Additionally, a display 106 may be incorporated in the display unit 104. The display 106 may be any conventional type of computer display including a liquid crystal display (LCD). The central processing unit 101 of the base unit 102 may generate output signals to form images on the display 106, and the power source 103 may provide voltage signals to supply power for the display 106.

Figure 2:
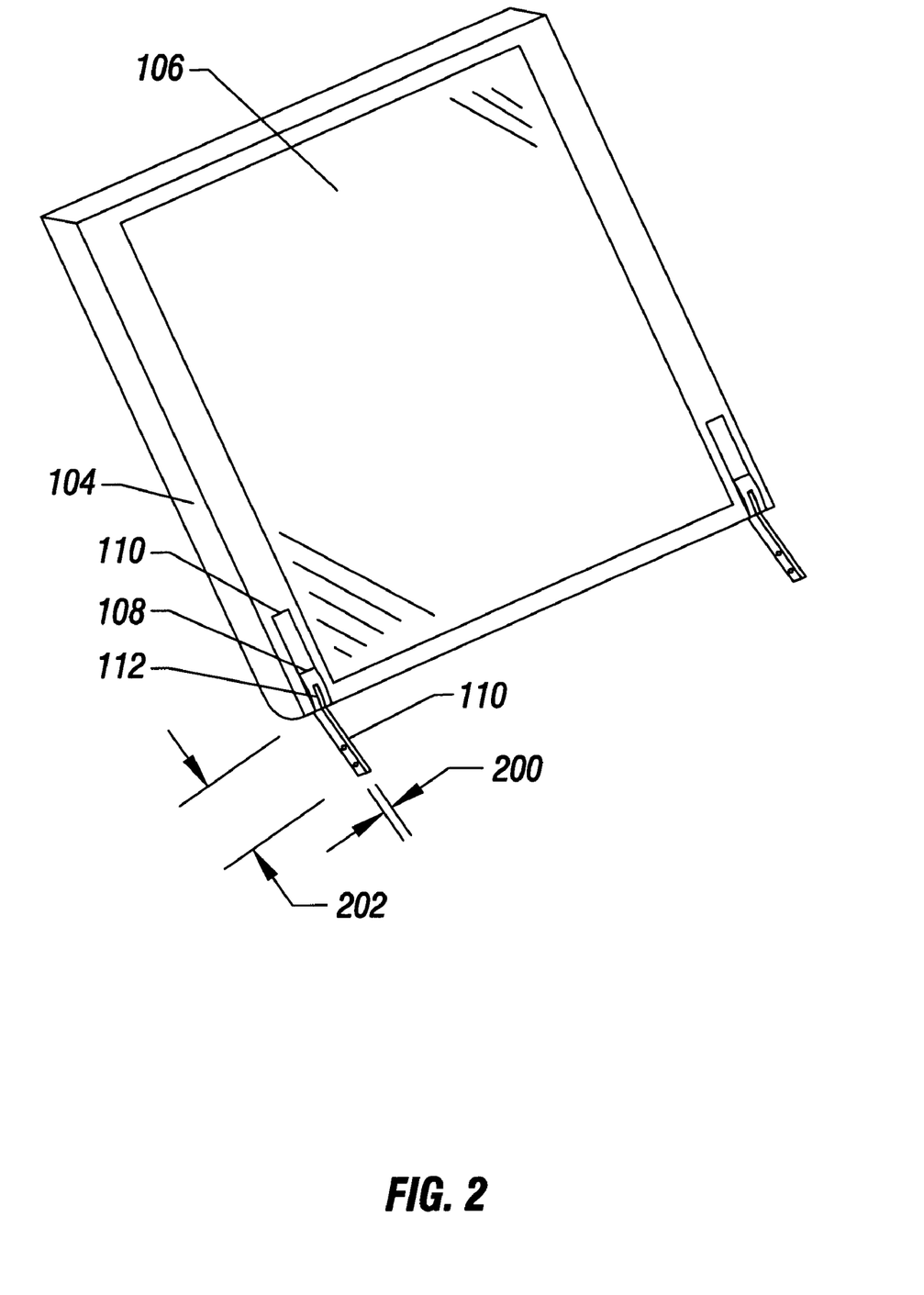
FIG. 2 is a perspective view of the portable computer illustrated in FIG. 1.

Referring to FIG. 2, the hinge 108 is shown in one embodiment as being attached to the display unit 104. The hinge 108 may include two members 110 that rotate about a pivot point 112. The hinge 108 may be a planar hinge such that that the members 110 are confined to rotate in approximately the same plane. In accordance with one embodiment, the members 110 of the planar hinge 108 may be staggered such that the members 110 overlap slightly at the pivot point 112. In another embodiment, the members 110 may converge squarely at the pivot point 112. The display unit 104 may be folded down on top of the base unit 104 by rotating the display unit 104 about the pivot point 112 of the hinge 108. One of the members of the planar hinge 108 may be attached to the display unit 104, and the other member may be attached to the base unit 102. In some embodiments, the width of the members 110 of the planar hinge 108, as shown by arrow 200, may be substantially less than the length of the members 110, as shown by arrow 202. Accordingly, the hinge 108 may be long and thin and may be located to the side of the display 106. For example, the planar hinge 108 may be attached near an outside edge of the display unit 104 as shown in FIG. 2. In another embodiment, a second planar hinge may be attached near a second outside edge of the display unit 104. In yet another embodiment, the planar hinge 108 may be mounted on an outside edge of the display unit 104. The planar hinge 108 may be made of a chrome metal for aesthetic purposes if the hinge 108 is exposed.

Figure 3:
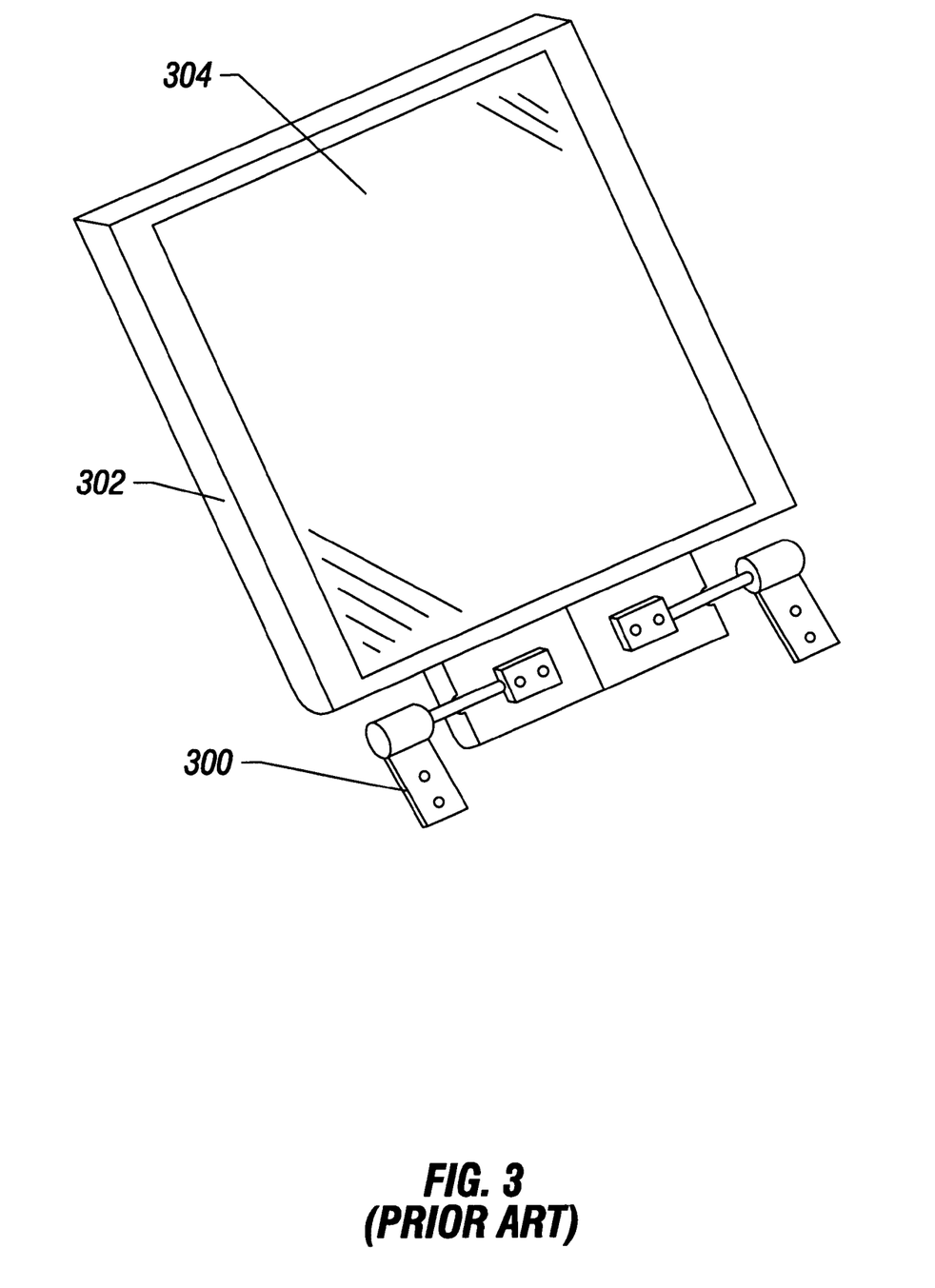
FIG. 3 is a perspective view of a conventional hinge mechanism for portable computers.

In accordance with the invention, a space near the bottom of the display unit 104 that is ordinarily occupied by a hinge assembly and connection wires may be available to accommodate a larger display 106. This arrangement is in contrast to a conventional hinge mechanism 300 that is depicted in FIG. 3 as being attached to a display unit 302. As shown, the hinge mechanism 300 may prevent the display 304 from occupying the lower portion of the display unit 302. Referring again to FIG. 2, by utilizing a planar hinge 108, the display 106 may occupy the area near the bottom of the display unit 104. Accordingly, the display 106 may be 10 to 20 millimeters taller than a typical portable computer display. The additional height of the display 106 may allow for significant improvement in output for the portable computer 100.

Figure 4:
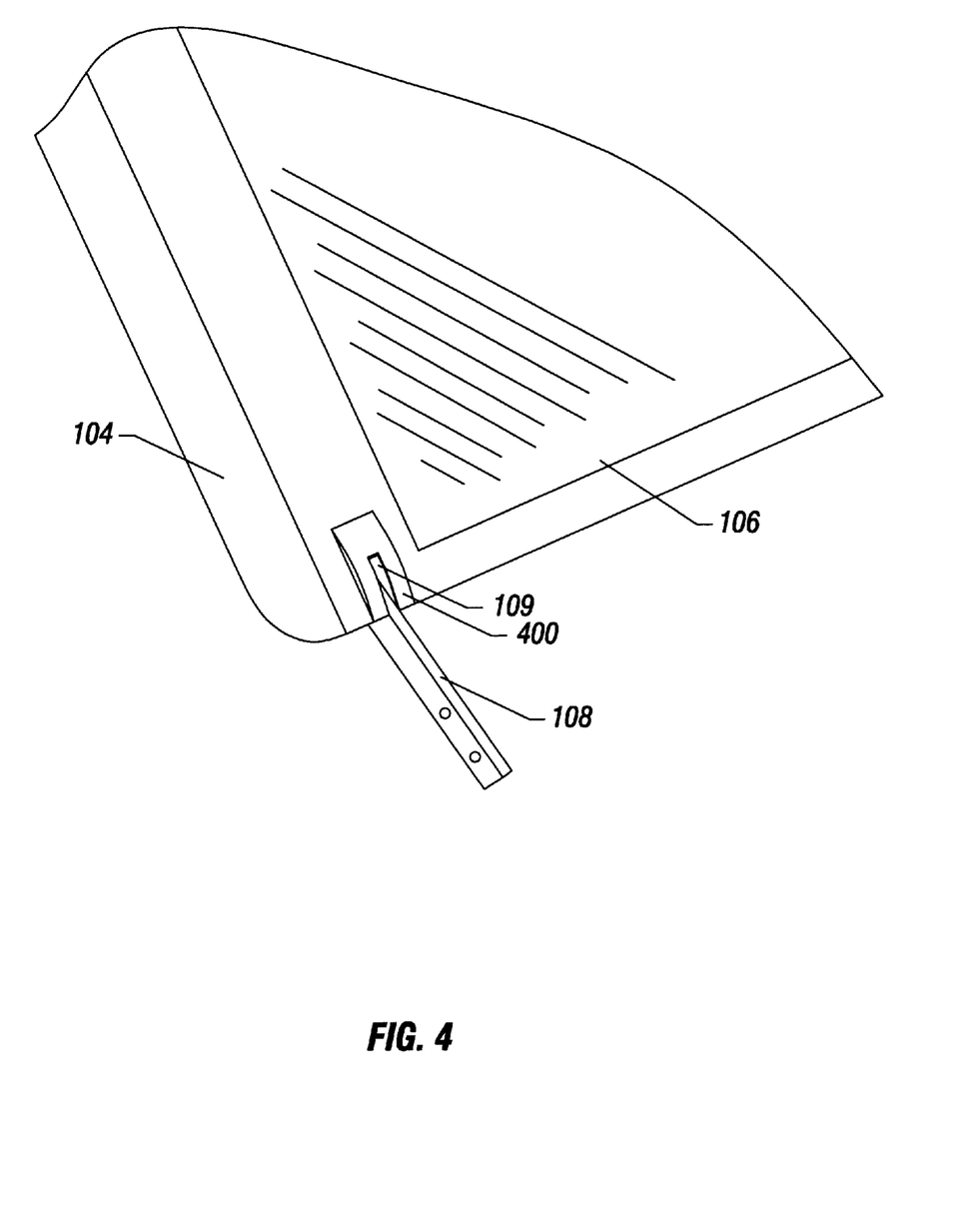
FIG. 4 is a perspective view of a portable computer showing a cover for a planar hinge in accordance with one embodiment of the invention.
Figure 8:
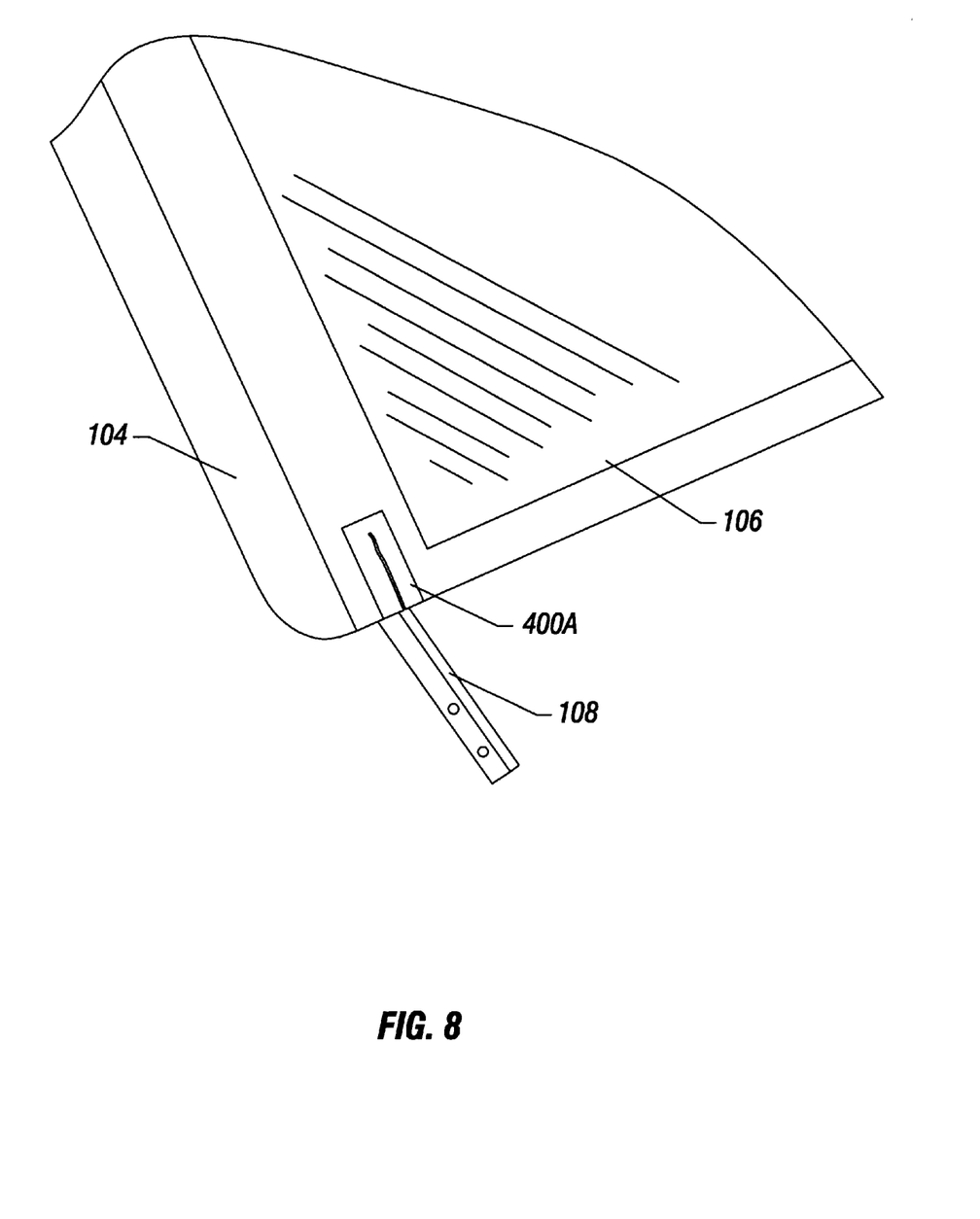
FIG. 8 is a perspective view of a portable computer showing a blade connection mechanism in accordance with a further embodiment of the invention.

In accordance with the invention, the display unit 104 may include a gap in the form of a slot 109 to accommodate rotation of the planar hinge 108. This gap may leave a small portion of the hinge 108 exposed. Referring to FIG. 4, the planar hinge 108 may include a cover 400 to prevent dust or dirt from damaging the hinge 108. In one embodiment, the cover 400 may be a plastic cover including the slot 109 in the middle to allow a member of the hinge 108 to rotate within the slot. In another embodiment, as shown in FIG. 8, a cover 400A may be a two-piece elastic curtain. The two pieces of the curtain may overlap in a center location of the curtain to allow a member of the hinge 106 to rotate through the center of the curtain.

Figure 5:
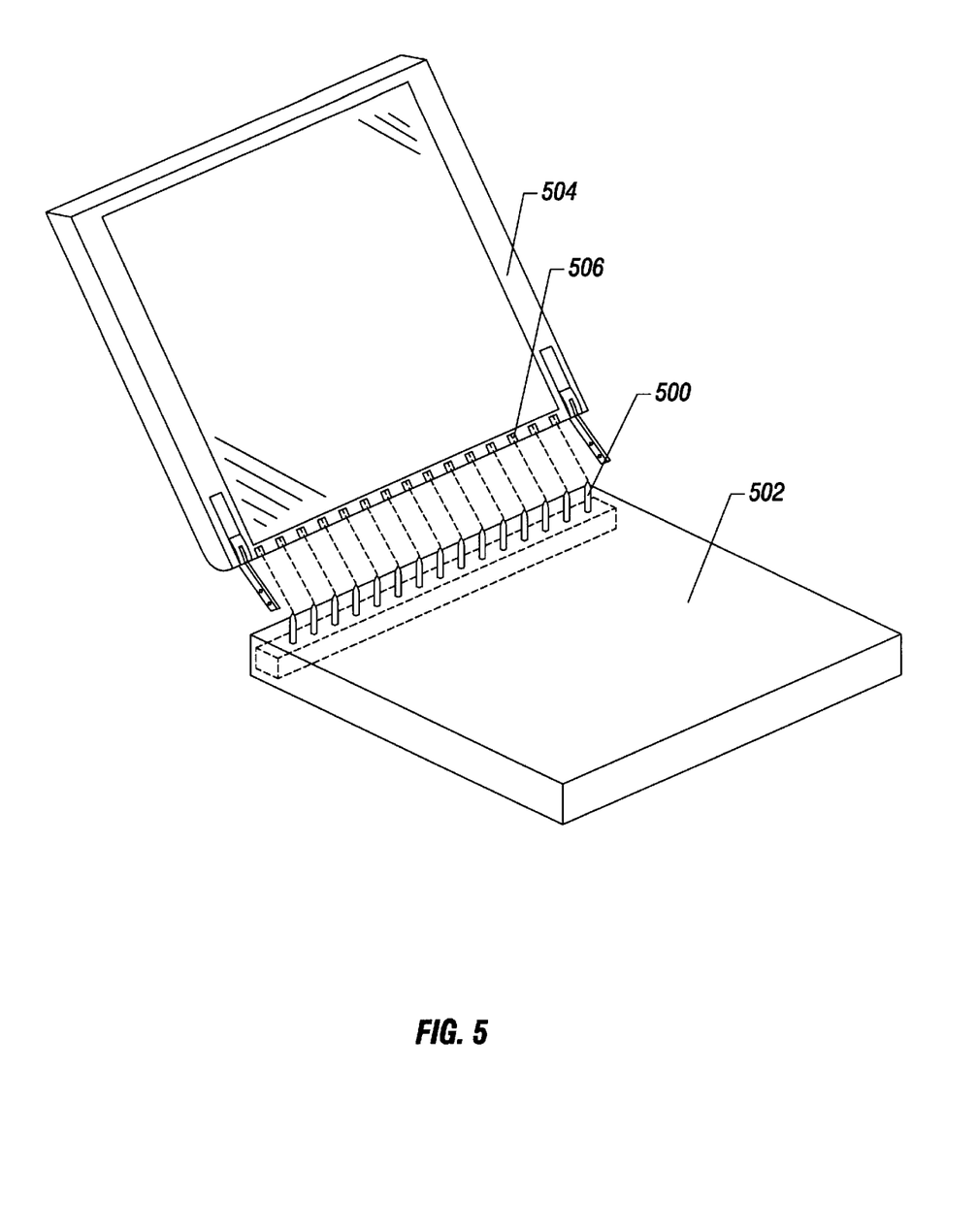
FIG. 5 is a perspective view of a portable computer showing a blade connection mechanism in accordance with one embodiment of the invention.

Conventional portable computers may utilize a hinge assembly to route electrical wires that supply power and output signals to a display. In accordance with the invention, the area near the bottom of the display unit 104 may not be available for routing connection wires. Instead, this area may be occupied by the display 106. Therefore, another mechanism may be employed to supply power and output signals to the display 106. Referring to FIG. 5, a blade connection mechanism may be utilized. In accordance with one embodiment of the invention, blade connectors 500 may be attached to the base unit 502 and protrude upward to connect to the display unit 504. The blade connectors 500 may be thin conducting surfaces made of any conventional conducting material. The display unit 504 may include female connectors 506 to sustain electrical contact with distal ends of the blade connectors 500.

Figure 6:
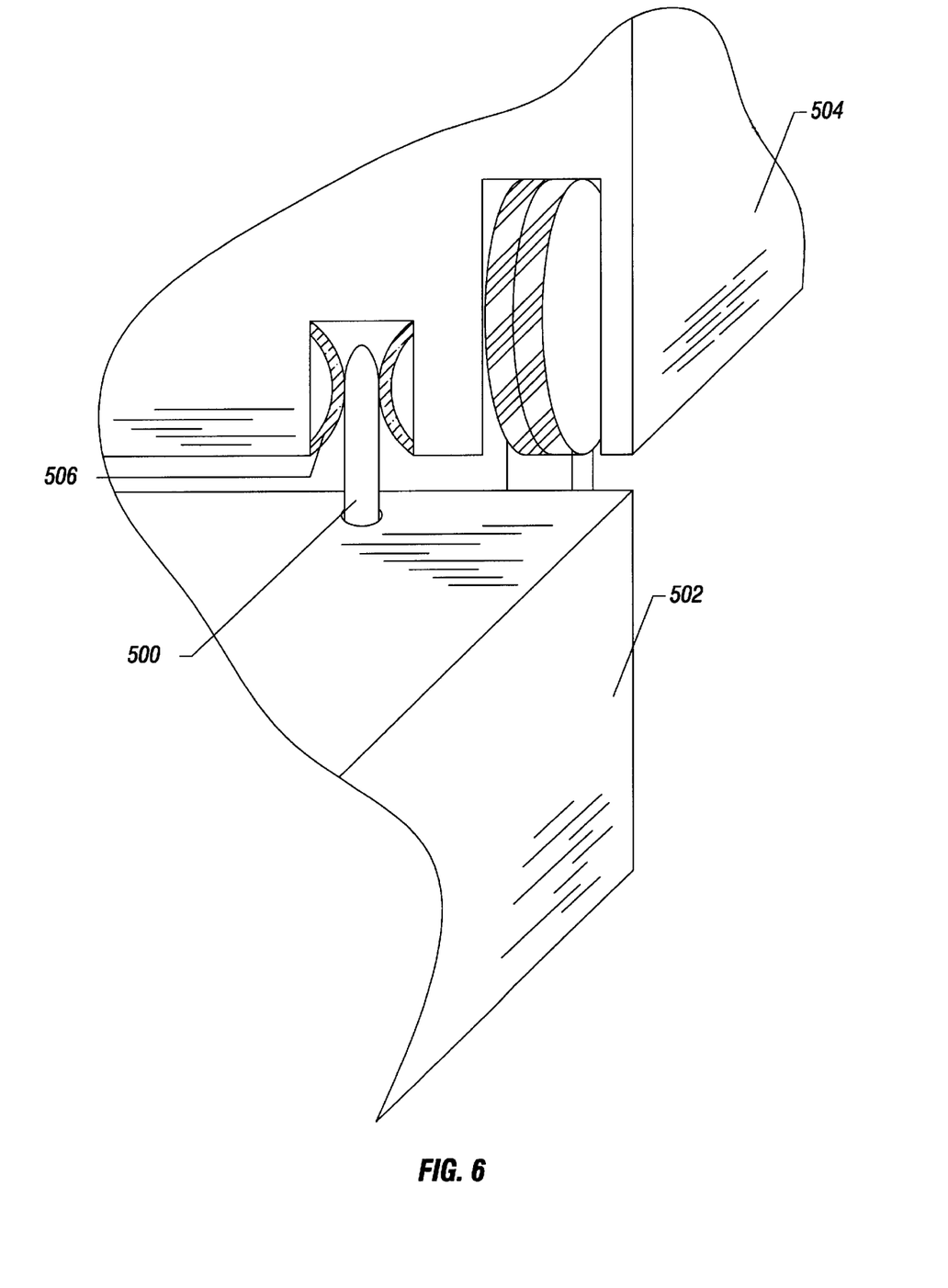
FIG. 6 is a perspective view of a portable computer showing a blade connection mechanism in accordance with another embodiment of the invention.
Figure 7:
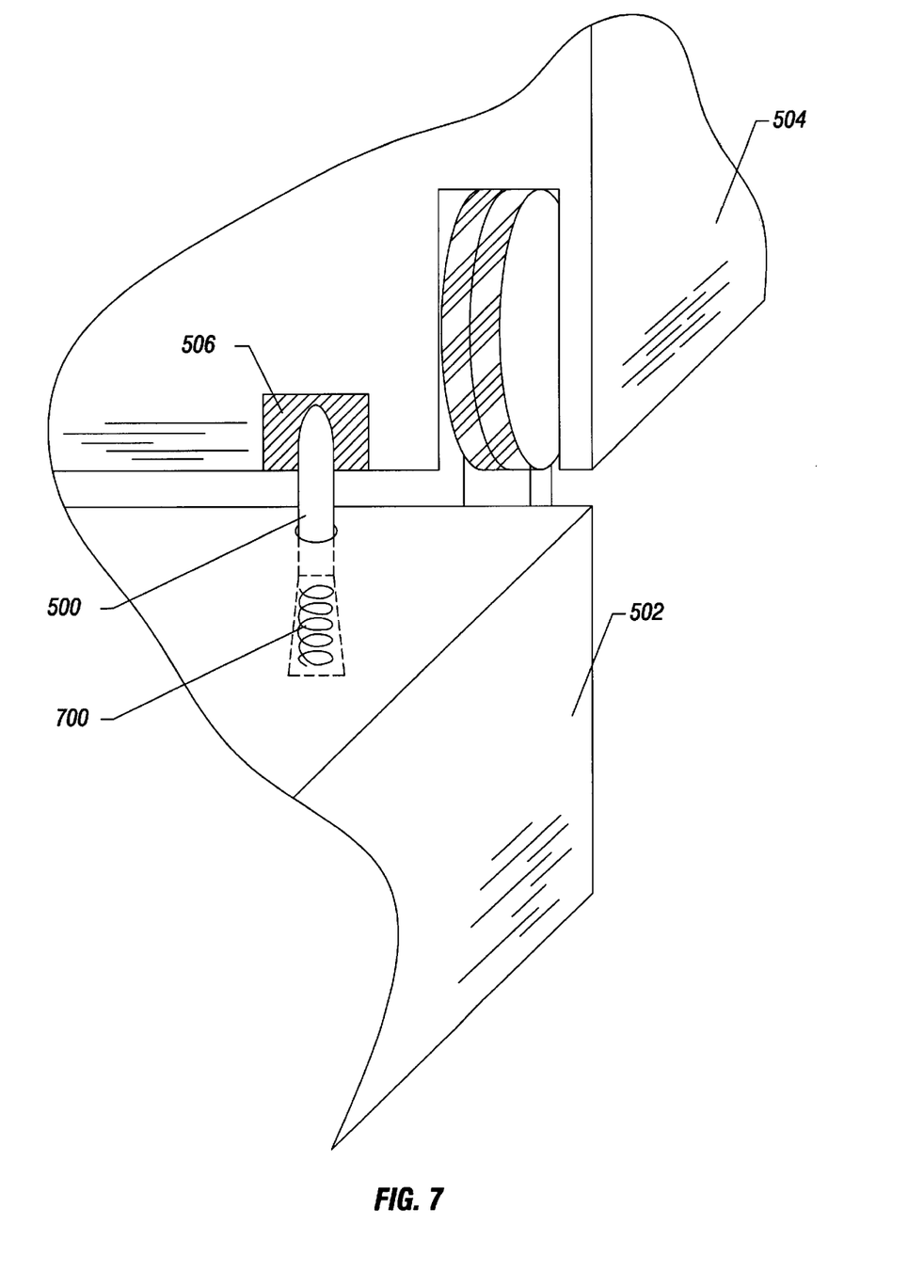
FIG. 7 is a perspective view of a portable computer showing a blade connection mechanism in accordance with yet another embodiment of the invention.

In one embodiment shown in FIG. 6, the female connectors 506 may be two-piece foil connectors into which the blade connectors 500 may be inserted. In another embodiment, the female connectors 506 may be conductive strips with which the blade connectors 500 maintain electrical contact as shown in FIG. 7. In some embodiments, the display unit 504 may not rotate about a fixed axis. Rather, the display unit 504 may rotate around a hinge assembly in an oval socket such that translational movement is allowed in addition to rotational movement. Therefore, the blade connectors 500 may be resilient to maintain contact with the female connectors 506 regardless of the position or rotation of the display unit 504. Accordingly, the blade connectors 500 may be moved up and down during the rotation of the display unit 504 by a spring 700 as shown in FIG. 7.

Through a blade connection mechanism, both power and output signals may be conducted from the base unit 502 to the display unit 504. In one embodiment, a single blade connector may conduct a voltage signal to power the display 106 while a second blade connector may act as a ground. In another embodiment, each blade connector may conduct a separate output signal to the display 106. In this embodiment, the number of blade connectors 500 utilized may be correlated to the number of separate output signals generated by the central processing unit 101 of the base unit 102. In accordance with another embodiment, the female connectors 506 may be located on the base unit 502. In this embodiment, the display unit 504 may include the blade connectors 500 to maintain electrical contact with the female connectors 506. Additionally, a cover for the blade connectors 500 and female connectors 506 may provide insulation and may shield the connectors 500 and 506 from dust and dirt.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A portable computer system comprising:

a display unit including a display;

a base unit coupled to the display unit;

a planar hinge coupling the base unit to the display unit;

a female electrical connector coupled to one of the base unit and the display unit; and a blade electrical connector coupled to the other one of the base unit and the display unit, the blade electrical connector adapted to make contact with the female electrical connector to conduct signals from the base unit to the display unit; and a cover for the planar hinge, wherein the cover comprises a plastic cover having a slot, the plastic cover adapted to allow the planar hinge to rotate through the slot.

2. A portable computer system comprising:

a display unit including a display;

a base unit coupled to the display unit;

a planar hinge coupling the base unit to the display unit;

a female electrical connector coupled to one of the base unit and the display unit; and a blade electrical connector coupled to the other one of the base unit and the display unit, the blade electrical connector adapted to make contact with the female electrical connector to conduct signals from the base unit to the display unit; and a cover for the planar hinge, wherein the cover comprises an elastic curtain for the planar hinge having two pieces, the curtain adapted to allow the planar hinge to rotate between the two pieces of the curtain.

* * * * *